US009221999B2

(12) United States Patent
Zupancich et al.

(10) Patent No.: US 9,221,999 B2
(45) Date of Patent: Dec. 29, 2015

(54) METHOD TO ACTIVATE SILICONE RUBBER SURFACES

(75) Inventors: John Andrew Zupancich, Maastricht (NL); Paul Wyman, Maastricht (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 13/518,131

(22) PCT Filed: Dec. 23, 2010

(86) PCT No.: PCT/EP2010/070663
§ 371 (c)(1),
(2), (4) Date: Sep. 6, 2012

(87) PCT Pub. No.: WO2011/076924
PCT Pub. Date: Jun. 30, 2011

(65) Prior Publication Data
US 2012/0322954 A1 Dec. 20, 2012

(30) Foreign Application Priority Data
Dec. 23, 2009 (EP) ..................... 09180584

(51) Int. Cl.
C09D 183/04 (2006.01)
C08J 7/02 (2006.01)
C08J 7/04 (2006.01)
C08G 77/38 (2006.01)
B05D 3/02 (2006.01)
B05D 3/10 (2006.01)
B05D 7/02 (2006.01)

(52) U.S. Cl.
CPC ............ C09D 183/04 (2013.01); C08J 7/02 (2013.01); *C08J 2383/04* (2013.01)

(58) Field of Classification Search
USPC ....................................... 525/477
See application file for complete search history.

(56) References Cited

U.S. PATENT DOCUMENTS

| 3,619,256 A | 11/1971 | Pepe et al. |
| 3,671,483 A | 6/1972 | Young |
| 4,122,127 A | 10/1978 | Mikami et al. |
| 4,332,844 A | 6/1982 | Hamada et al. |
| 4,401,500 A | 8/1983 | Hamada et al. |
| 4,431,472 A | 2/1984 | Hohl et al. |
| 4,436,787 A | 3/1984 | Mikami et al. |
| 4,534,815 A | 8/1985 | Hamada et al. |
| 4,546,018 A | 10/1985 | Ryuzo et al. |
| 4,598,134 A | 7/1986 | Hirai et al. |
| 4,654,236 A | 3/1987 | Finzel |
| 4,681,636 A | 7/1987 | Saito et al. |
| 4,704,419 A | 11/1987 | Fukayama et al. |
| 4,749,741 A | 6/1988 | Saito et al. |
| 4,808,483 A | 2/1989 | Nakasuji et al. |
| 4,828,561 A * | 5/1989 | Woodroof ............ 623/8 |
| 4,846,886 A | 7/1989 | Fey et al. |
| 4,923,946 A | 5/1990 | Meddaugh |
| 4,980,231 A | 12/1990 | Baker et al. |
| 5,213,617 A * | 5/1993 | Blizzard .......... 106/287.13 |
| 2004/0023042 A1 | 2/2004 | Suzuki et al. |
| 2007/0232822 A1 * | 10/2007 | Arkles et al. .......... 556/407 |

OTHER PUBLICATIONS

Gelest Hydrophobicity, Hydrophilicity and Silane Surface Modication Catalog, 2006.*
Gelest Silane Coupling Agents: Connecting Across Boundaries Catalog, 2006.*
Cognard, "Adhesives and Sealants Handbook of Adhesives and Sealants Volume 2", p. 144-146 2006.*
Lee et al. "Solvent Compatibility of Poly(dimethylsiloxane) based Microfluidic Devices", Analytical Chemistry 75 6544-6554 Dec. 2003.*
International Search Report for PCT/EP2010/070663 mailed May 13, 2011.
Written Opinion of the International Searching Authority mailed May 13, 2011.

* cited by examiner

*Primary Examiner* — Randy Gulakowski
*Assistant Examiner* — Christopher M Rodd
(74) *Attorney, Agent, or Firm* — Nixon & Vanderhye P.C.

(57) ABSTRACT

A method for activating silicone rubber surfaces comprising steps of: i) swelling at least the surface of the silicone rubber matrix with a silicone rubber swelling solvent; ii) treating the silicone rubber matrix during or after the swelling with a solution comprising at least a reactive silane, the reactive silane comprising: a) at least one Si—C bond and; b) at least one hydrolytically labile bond linked to at least one of the Si atoms present in the reactive silane and; c) at least one functional group F1 connected via a Si—C bond to the same or an other Si atom present in the reactive silane, the functional group comprising electrophilic and/or nucleophilic moieties, and/or at least one functional group F2 connected via a Si—C bond to the same or an other Si atom present in the reactive silane comprising moieties which become electrophilic or nucleophilic moieties by a mechanism selected from the group consisting of ring opening of a cyclic structure, hydrolysis, displacement or by a migration reaction; iii) drying and/or heat treating of the treated silicone rubber matrix.

18 Claims, 2 Drawing Sheets

METHOD TO ACTIVATE SILICONE RUBBER SURFACES

Figure 1A:
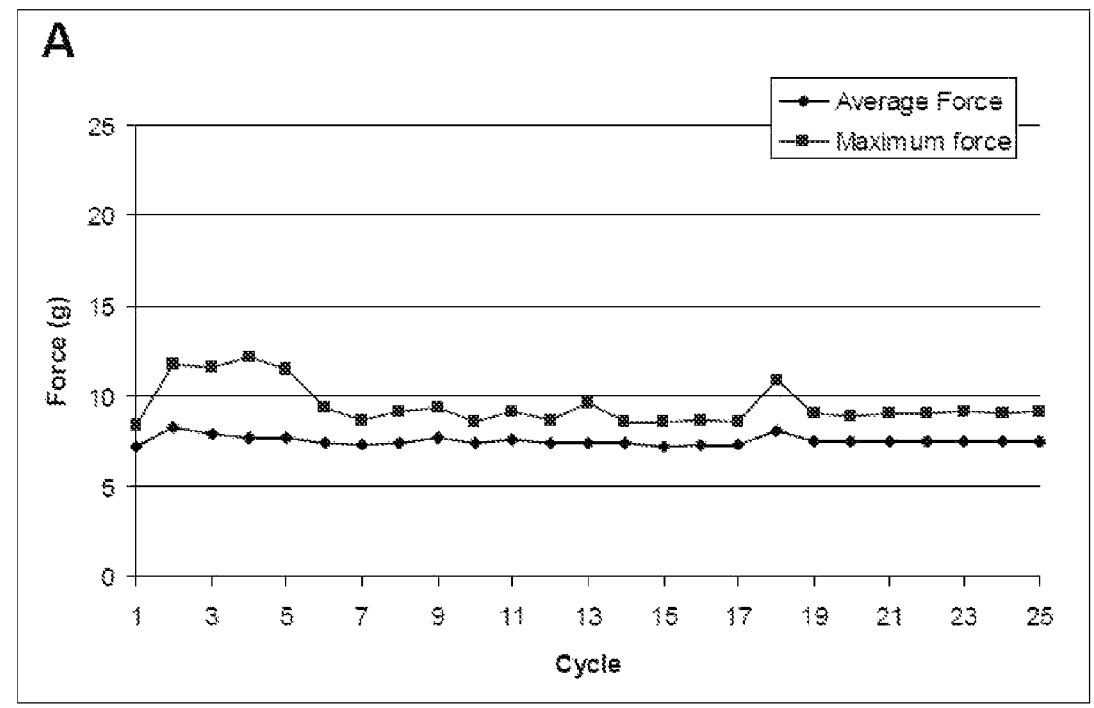

This application is the U.S. national phase of International Application No. PCT/EP2010/070663 filed 23 Dec. 2010 which designated the U.S. and claims priority to EP 09180584.6 filed 23 Dec. 2009, the entire contents of each of which are hereby incorporated by reference.

The invention relates to a method to activate silicone rubber substrates in order to improve adherence of coatings, it also relates to an activated substrate obtainable according to the method, it further relates to a method for making the activated silicone rubber substrates hydrophilic and to the hydrophilic surfaces obtainable by such method and finally it also relates to use of reactive silanes to activate silicone rubber surfaces.

Silicone rubber (for example poly(dimethylsiloxane) or shortly PDMS) is defined herein as a polymer that has a "backbone" of silicone-oxygen linkages, i.e. consists of Si—O—Si units. Due to its large bond angles and bond lengths compared to those found in most other polymers, silicone rubber is very flexible and can be extruded into tubes, strips, solid cord or custom profiles according to any size restrictions. Cords can be joined to make O-rings and extruded profiles can be joined to make seals. Silicone rubber can also be molded into custom shapes and designs. It is also used frequently as an insulating material.

Becoming more and more common at consumer level, silicone rubber products can be found in automotive applications; in a large variety of cooking, baking, and food storage products; in sportswear and footwear; in electronics; in home repair and hardware, and many more applications.

Silicone rubber is a highly inert material and does not react with most chemicals. Due to its inertness, it is also used in many medical applications and in medical implants. For example, medical devices that contact tissue or bodily fluids during therapeutic implementation may be manufactured from silicone rubber. Ideally, medical devices will exhibit certain surface properties such as a lubricious character, to minimize soft tissue damage upon their insertion into or removal from the body.

Herein a "lubricious" object is defined as an object having a slippery surface characterized by a low coefficient of friction. For such lubrication purposes, medical devices may have a hydrophilic surface coating or layer which becomes lubricious and attains low-friction properties upon wetting, i.e. applying a wetting fluid for a certain time period prior to insertion of the device into the body of a patient. A hydrophilic surface coating or layer which becomes lubricious after wetting is hereinafter referred to as a hydrophilic coating. A coating obtained after wetting is hereinafter referred to as a lubricious coating.

Durable, lubricious coatings comprised of hydrophilic polymers or hydrogels have been successfully applied to a variety of medical devices. However, a number of polymeric substrates commonly used in medical device manufacture have material properties (e.g., low surface energy, chemical inertness, lack of chemical functionality) that make them difficult to coat. Silicone rubbers typify such "difficult to coat substrates", as an inability to form covalent bonds with the silicone surfaces results in poor coating adhesion and reduced coating durability. Thus medical devices made from silicone rubber may often lack the required lubricious character, and various treatments (such as applying suitable coatings) are often employed to improve the material surface properties.

General techniques to improve the wetting and adhesion properties of coatings on polymeric surfaces may use for instance hydrogen bonding, polymer chain entanglement or the incorporation of reactive functionalities such as amines into the polymer backbone. For instance, it would be beneficial for improving the wetting properties of the silicone rubber surfaces to change its surface energy to be preferably 30 mN/m or more, as measured according to the procedure described in ISO 8296:2003.

However, typical silicone rubber surfaces do not posses any sites for hydrogen bonding with surface coatings. Additionally, the high flexibility of common silicone rubbers leads to the rapid disentanglement of non-covalently bound polymer chains in the silicone rubber network (referred herein as matrix) and loss of coating adhesion. Furthermore, due to the chemically inert nature of silicone rubber materials, it is very difficult to incorporate reactive functionalities into the material to facilitate coating adhesion.

Efforts to increase the wetting and adhesion properties of coating formulations on silicone rubber substrates include incorporating functional groups into the PDMS pre-polymers prior to curing. Functional groups present at the rubber surface are then utilized to form covalent linkages between the substrate and the coating. A more convenient approach is to directly modify the silicone rubber surface, generating chemical functionality that can then subsequently react with a chemical species (e.g., monomers or reactive species in a coating formulation) to yield a covalently bound coating.

It is therefore desired to find a method to change the surface properties of silicone rubber, activating it such that it enables further chemical modifications to facilitate adhesion of coatings to silicon rubber surfaces or even adhere silicone rubber with other materials or with itself.

Effective application of coatings to medical devices produced from silicone rubber has been a challenge. A number of surface modification treatments (e.g., chemical etching, plasma treatment) have been examined and found unsatisfactory. Disadvantages include the use of harsh chemicals and the extended times required for the treatment step, inability to homogeneously treat the complete surface area of the device and/or the insufficient coating performance after its application on these pre-treated devices.

For instance, plasma treatment of silicone rubber gives hydroxyl or other reactive groups that are weakly linked to the material surface. These isolated functional groups have been shown to reorient over time, reverting the silicone surface back to the original, chemically inert state when devices are stored under ambient conditions. Therefore, due to this problem of "aging" the silicone rubber surface has to be coated almost immediately after the plasma treatment to be able to utilize these fleeting reactive species. Furthermore, treating with plasma is usually done under vacuum, which has the disadvantage that low molecular weight species may evaporate and form a gas or vapour phase that must be constantly removed to maintain the vacuum quality. Yet another disadvantage when utilizing plasma treatment is the difficulty to homogeneously treat the total surface of devices with complex geometries, e.g. the inner lumen treatment of silicone tubing.

Another possibility is to modify the surface of the silicone rubber by UV-ozone treatment. However, such treatment is toxic, it is difficult to homogeneously modify the surface of devices with complex inner geometries and if the surface is UV absorbing it can not be treated with such a method.

Another surface treatment is by contacting the silicone rubber surface with solutions with various UV reactive monomers and grafting these monomers by UV treatment in the solution. However, the disadvantage of this method is that the monomer solution can be used only once, as the UV treatment consumes the monomers in the solution and a fresh monomer solution has to be made for each application. This method is effective in the sense that it can ensure a good adhesion, it is however inefficient as a significant amount of the monomers used in the process are disposed of as waste and the process time may also be long.

The review paper "Surface modification of poly(dimethylsiloxane) microchannels", Journal Electrophoresis 2003, 24, 3607-3619 describes various modification techniques to PDMS microchannels, including silanization. Graft polymerisation onto silicone surface is described in the paper of H. Iwata and S. Isozaki in the Journal of Applied polymer Science, vol. 49, 1041-1046 (1993). The activation of silicone is also described in U.S. Pat. No. 6,132,765 and WO02070022.

Polymerisation within PDMS to form a cross linked interpenetrating network (IPN) is described in Hillerstrom, A. et al "Transparency and wettability of PVP/PDMS-IPN synthesized in different organic solvents" in Journal of Applied Polymer Science (2009) 114: 1828-1839; and in Hillerstrom, A. and Kronberg, B. "A two-step method for the synthesis of a hydrophilic PDMS interpenetrating polymer network" in the Journal of Applied Polymer Science (2008) 110: 3059-3067.

There remains a need to improve the adherence of coatings, in particular of hydrophilic coatings, to silicone rubber surfaces.

It is the object of the present invention to solve the disadvantages presented above, such as aging of reactive functionality, difficulty to coat complex geometry and extensive monomer waste, shown by silicone rubber surfaces treatments according to the prior art and to provide an activated silicone rubber surface characterised by an improved adherence to hydrophilic coatings.

Surprisingly, we have found a method of chemical activation that provides free active functionality on the surface (and if desired even in the bulk) of silicone rubber that is more stable in time and results in surfaces having improved wetting and adhesion with coatings.

By activation here and hereafter is meant that the silicone rubber surface is physically or chemically modified to provide reactive functionality that can further react with the hydrophilic coating formulations or other surfaces.

More precisely, it was found that the above mentioned technical problems can be solved by using a treatment method for activating the silicone rubber substrates by means of reactive silanes dispersed or dissolved in a silicone rubber swelling solvent.

According to the present invention there is provided a method for activating silicone rubber surfaces comprising steps of:
i) swelling at least the surface of the silicone rubber matrix with a silicone rubber swelling solvent;
ii) treating the silicone rubber matrix during or after the swelling with a solution comprising at least a reactive silane, the reactive silane comprising:
a) at least one Si—C bond and;
b) at least one hydrolytically labile bond linked to at least one of the Si atoms present in the reactive silane and;
c) at least one functional group F1 connected via a Si—C bond to the same or an other Si atom present in the reactive silane, the functional group comprising electrophilic and/or nucleophilic moieties,
and/or
at least one functional group F2 connected via a Si—C bond to the same or an other Si atom present in the reactive silane, comprising moieties which become electrophilic or nucleophilic moieties by a mechanism selected from the group consisting of ring opening of a cyclic structure, hydrolysis, displacement or by a migration reaction; and
iii) drying and/or heat treatment of the treated silicone rubber matrix.

The Si—C bond a) above may be same or different than the Si—C bond referred to under c).

Nucleophilic here and hereafter describes the affinity of a nucleophile to the nuclei. By nucleophile herein is meant a reagent that forms a chemical bond to its reaction partner (the electrophile) by donating both bonding electrons. All molecules or ions with a free pair of electrons can act as nucleophiles. A nucleophile is an electron-rich chemical reactant that is attracted by electron deficient compounds. Nucleophiles may take part in nucleophilic substitution, whereby a nucleophile becomes attracted to a full or partial positive charge.

Electrophilic here and hereafter describes the affinity of an electrophile to electrons. By electrophile herein is meant a reagent attracted to electrons that participates in a chemical reaction by accepting an electron pair in order to bond to a nucleophile. Most electrophiles are positively charged, have an atom which carries a partial positive charge, or have an atom which does not have an octet of electrons. The electrophiles attack the most electron-populated part of a nucleophile.

The described silicone rubber surface activation method according to the invention offers a number of improvements. The most important advantage of such process is that the activation process is remarkably fast. Additionally, the process of swelling and activation leads to homogeneous treatment of the complete device surface with the reactive silane, resulting in a homogeneous surface activation. Moreover, if the silicone rubber is swollen longer in the activating solution, even a matrix/bulk activation may be achieved. Although this may be less preferred for the case of medical devices (since the presence of the bulk modification may result in modifications of elastic properties), it is to be understood that the method of activation according to the invention refers to both surface and bulk modification. In that sense, by surface activation herein is meant activation in the depth of the matrix of from the order of magnitude from nm to mm, depending also on the size (outer diameter, thickness, etc) of the silicone rubber article that needs activation. Preferably up to 5% of any of the size characteristics is swollen and activated according to the method of the invention. Preferably the surface activation occurs to a depth of at least up to 1 micron at the outer part of the silicone rubber matrix.

The advantageous properties of a silicone rubber surface activated according to the method of the invention are that the activated silicone rubber devices prepared as described in the invention should be less susceptible to the deleterious effects of "aging" as compared to other surface activation steps such as plasma or chemical treatments. It may therefore be possible to batch treat devices and store them at ambient conditions for a period of time prior to application of the coating. The isolated functional groups generated from chemical or plasma treatment of silicone substrates have been shown to reorient over time, reverting the silicone surface back to the original, inert state when devices are stored under ambient conditions. Although we do not wish to be bound by the following theory, it is believed that the functional silane species generated at the device surface during the silicone rubber activation step are probably incapable of rearrangements due to the deeper penetration of the reactive silane into the silicone rubber matrix and due to the generation of a functional silane network through moisture and temperature promoted oligomerization and/or polymerization of the reactive silane.

The silane treatment is an efficient activation step for a variety of silicone rubber surfaces, substrates or devices. The surface bound reactive groups present after the silane treatment facilitate wetting and adhesion of hydrophilic coatings to surfaces and devices (such as medical devices) made from silicone rubber. For medical devices, it is particularly useful to coat the inner and outer lumen of silicone catheters.

The method of silicone rubber activation according to the invention will be further described in detail.

Before applying the method to activate silicone rubber surfaces according to the invention, it may be useful to remove contaminants such as dust or grease from the silicone rubber. A cleaning step is thus optional in the activation process, depending on the initial cleanness of the silicone rubber surface. For instance in case of silicone rubber tubing to be activated, the outer surface may be sufficiently clean, but contaminants may need to be removed from inner surfaces prior to the activation step.

Any cleaning method is acceptable as long as it leaves the silicone rubber surface substantially free of dirt, fat and any other impurities. Preferably the silicone rubber surface is cleaned by rinsing, soaking or sonication for example in alcohols, alkanes, or any solvent capable of removing impurities from the device surface, including swelling solvents. If alcohols are used to clean the substrate, it is advantageous to remove the cleaning solvent from the substrate, as the hydroxyl groups of the solvent may react with the silanes giving poor activation.

The cleaning may thus also be performed simultaneously with swelling by contacting the silicone rubber with swelling solvent(s).

The swelling step of the silicone rubber surface facilitates penetration of the reactive silane into the silicone rubber matrix.

The silicone rubber surface is swollen in suitable solvents which have the role to open the silicone rubber matrix, such that the reactive silane may easier diffuse into the silicone rubber matrix.

Suitable swelling solvents will cause swelling of the silicone rubber causing a swelling ratio higher than 1.05, preferably higher than 1.10 and more preferably higher than 1.20. The swelling ratio is the ratio between the length of a PDMS sample in the swelling solvent and the length of a dry PDMS sample. The swelling ratio is determined as described by J. Ng Lee et al in Journal Anal. Chem. 2003, pages 6544-6554.

Possible solvents that can swell the silicone rubber matrix include: pentane, hexane, cyclohexane, heptane, ethyl acetate, diethyl ether and any number of other silicone rubber swelling organic solvents. Heptane is a promising solvent for the treatment (activation) process from a health perspective.

The time needed to swell the silicone rubber surface depends on the desired depth of activation. For surface activation a few seconds, such as from 15 to 60 seconds may be enough. However, a bulk activation of the matrix is also possible provided the matrix is contacted sufficient time (in the order of few minutes) with the treatment solution.

The method according to the invention also may include an optional step of plasma treatment of the silicone rubber before or after the swelling step (or even before cleaning) by any type of plasma treatment procedure, such as atmospheric, vacuum or corona plasma treatment.

The swelling step need not be a separate step, as the swelling and activation steps may be coupled in a single step by treating the silicone rubber with a solution that comprises a swelling solvent and the reactive silane. For simplicity, the solution used in the activating (treatment) step will be from now on referred to as treatment solution.

By combining the swelling and activation steps by using a single treatment solution, the act of swelling may help in the same time to draw silane species into the matrix.

The silicone rubber may also be pre-swollen prior to activation. If the swelling and the activation steps are done separately, the treatment solution used for activation of the silicone rubber surface may contain the same solvent as used in the swelling step. However, it is not necessary to use the same solvent to swell and activate the silicone rubber, it is also possible to use another swelling solvent as long as the two solvents are compatible (miscible) and that the solvents are not reactive with the silane present in the treatment solution. Such a situation may occur for example when the silicone rubber is first cleaned with a swelling solvent and then activated with a treatment solution. If preswollen with solvent and silane applied in a non-swelling solvent one would expect only limited penetration of the silane into the matrix. Thus the combination of preswelling and activation with different swelling solvents may give good control over depth of silane diffusion into the substrate or extent of surface activation.

The solution needed for the silicone rubber surface activation may be prepared by dispersing/dissolving the reactive silane in a solvent or medium that can swell the silicone rubber matrix. It is not necessary that the reactive silane disolves completely in the solvent (i.e., forms a clear solution), a slightly turbid or even turbid reactive silane solution may also be employed in the activation step.

The treatment solution may comprise one reactive silane or a combination of two or more of the reactive silanes as described herein.

Therefore, this treatment or activation step ensures the silicone rubber surface modification, thereby providing surface functionality that facilitates wetting and adhesion.

The treatment solution preferably comprises a solvent which may promote swelling of the silicone rubber and at least a reactive silane. The reactive silane preferably comprises at least one Si—C bond and at least one hydrolytically labile bond (i.e. a hydrolysable group) linked to at least one Si atom present in the reactive silane.

The reactive silane may be monopodal (i.e. has one Si atom), polypodal (i.e. has two or more Si atoms) or may have a cyclic structure.

The hydrolytically labile bond may be present in the form of a —Si—O—Si— bond or as a hydrolysable group linked to a Si atom, which hydrolysable groups may be for instance halogens, methoxy groups, ethoxy groups, other alkoxy groups, amines, thiols and other leaving groups and combinations thereof.

The reactive silane preferably comprises at least a functional group F1 connected via a Si—C bond to the same or an other Si atom present in the reactive silane, the functional group comprising electrophilic and/or nucleophilic moieties. The reactive silane may also comprise, in place of an F1 functional group or in addition to it, at least one functional group F2 connected via a Si—C bonds to the same or an other Si atom, F2 comprising moieties that may become electrophilic and/or nucleophilic by a mechanism such as ring opening of a cyclic structure, hydrolysis, displacement or by a migration reaction.

The functional group of the reactive silane may be comprised of nucleophilic moieties such as primary, secondary or tertiary amines, thiols, hydroxyls, carboxyl groups and combinations thereof. The functional groups of the reactive silane may also be comprised of electrophilic moieties such as mono- or poly-unsaturated ethylenic functionality, an allylic, acrylic or vinylic functionalities.

Preferably the reactive silane molecule comprises also a spacer group (X1) situated between a Si atom and a functional group of the reactive silane. The spacer group may comprise for example an alkyl chain of two or more methylene groups or more. Furthermore, hydrophilicity of the reactive silane molecule can be tuned by choosing a spacer group (X1) which is intrinsically hydrophilic, such as for example (but not limited to) ethylene oxide units of various length n $(CH_2CH_2O)_n$, thereby providing an additional means of further increasing and/or controlling surface energy.

The reactive silanes have preferably a good shelf life in the absence of water (humidity, moisture) and polymerise with themselves in the presence of trace amounts of water. By trace amounts of water herein is meant molar equivalence of at least 0.01 mol % of catalytic amounts to greater than stoichiometric. Furthermore, they are soluble or at least dispersible in the solvent used to swell the silicone rubber matrix.

Preferably the silicone rubber substrate is activated using one or more of reactive silanes having the following formulas I-V:

alkoxysilane having the formula (I)

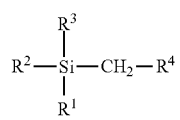

(I)

wherein $R^1$, $R^2$, and $R^3$ are independently selected from the group consisting of branched and linear, substituted and unsubstituted alkyl, alkenyl and alkoxy groups, halogens and hydrogen; and wherein $R^4$ is selected from the group consisting of primary, secondary or tertiary amines, thiols, hydroxyls, carboxyl groups, mono- or poly-unsaturated ethylenic functionality, an allylic, acrylic, vinylic, epoxide functionalities and combinations thereof.

Specific examples of compounds of the general type show in Formula (I) include for instance 4-aminobutyltriethoxysilane, N-(2-aminoethyl)-3-aminoisobutylmethyldimethoxysilane, N-(2-aminoethyl)-3-aminopropylmethyldimethoxysilane, N-(2-aminoethyl)-3-aminopropyltriethoxysilane, N-(2-aminoethyl)-3-aminopropyltrimethoxysilane, 3-aminopropylmethyldiethyoxysilane, 3-aminopropyltriethoxysilane, 3-aminopropyltrimethoxysilane, 3-mercaptopropyltriethoxysilane, 3-aminopropyldimethylfluorosilane, 3-mercaptopropyltrimethoxysilane, 3-mercaptopropylmethyldimethoxysilane, mercaptomethylmethyldiethoxysilane, (3-trimethoxysilylpropyl)diethylenetriamine, (3-glycidoxypropyl)triethoxysilane, 3-glycidoxypropyl)trimethoxysilane, (methacryloxymethyl)methyldimethoxysilane, (methacryloxymethyl)trimethoxysilane, methacryloxypropylmethyldichlorosilane, and methyacryloxypropyltrimethoxysilane, N-[1-(dimethoxy-methyl-silyl) propyl]ethane-1,1-diamine, 3-(diethoxy-methyl-silyl)propan-1-amine, N-[3-(dimethoxy-methyl-silyl)propyl]ethane-1,2-diamine, 5-(dimethoxy-methyl-silyl)pentane-1,3-diamine and their isomers;

a polypodal silane compound comprising a structure according to Formula (II):

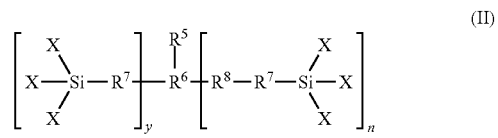

(II)

wherein:

$R^5$ is selected from hydrogen, and substituted and unsubstituted, branched and straight chain, alkyl, alkenyl, alkynyl, aryl, alkylene ether, alkenyl ether, alkynyl ether or aryl ether groups, and wherein, in $R^5$, oxygen atoms are not bonded together so as to form peroxy functionality;

$R^6$ is selected from substituted and unsubstituted, branched and straight chain alkyl groups, alkylene ether groups, amines, ethers, esters and other connecting functional moieties;

$R^7$ is selected from substituted and unsubstituted, branched and straight chain alkyl groups, wherein each $R^7$ group in Formula (II) may be the same or different;

$R^8$ is selected from substituted and unsubstituted, branched and straight chain alkyl, alkylene, alkylene ether and alkenyl ether groups, and an ether linkage;

X is a hydrolyzable group capable of bonding to a siliceous entity and of being displaced by a silicon-oxygen bond or a non-hydrolyzable organic functional group, wherein at least one of the X groups on each Si atom is hydrolyzable;

n is 0 or an integer which is no greater than 3;

y is 0 or an integer which is no greater than 3; and wherein $2 \leq n+y \leq 3$; and n and y are never both zero.

Specific examples of compounds of the general type shown in Formula (II) include for instance bis(3-trimethoxysilylpropyl)amine, bis[(3-trimethoxysilyl)propyl]ethylenediamine, bis[3-(triethoxysilyl)propyl]disulfide and 1,3-bis(triethoxysilylethyl)tetramethyldisiloxane.

azasilacyclopentane having formula (III),

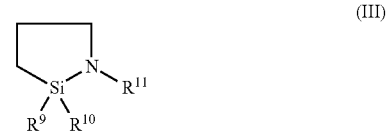

(III)

wherein $R^9$ and $R^{10}$ are independently selected from the group consisting of branched and linear, substituted and unsubstituted alkyl, alkenyl, and alkoxy groups; and wherein $R^{11}$ is selected from the group consisting of substituted and unsubstituted, saturated and unsaturated, branched and linear aliphatic hydrocarbon groups, substituted and unsubstituted, branched and linear aralkyl groups, substituted and unsubstituted aryl groups, and hydrogen.

Specific examples of compounds of the general type show in Formula (III) include for instance 2,2-dimethoxy-N-butyl-1-aza-2-silacyclopentane, 2-methyl-2-methoxy-N-(2-aminoethyl)-1-aza-2-silacyclopentane, 2,2-diethoxy-N-(2-aminoethyl)-1-aza-2-silacyclopentane, 2,2-dimethyl-N-allyl-1-aza-2-silacyclopentane, 2,2-dimethoxy-N-methyl-1-aza-2-silacyclopentane, and 2,2-diethoxy-1-aza-2-silacyclopentane.

diazasilacyclic compound having the formula (IV):

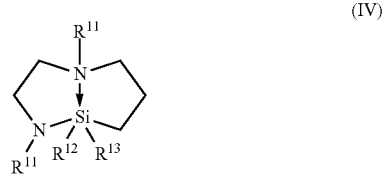

wherein the $R^{11}$ groups are independently selected (i.e., they may be the same or different) from the group consisting of substituted and unsubstituted, saturated and unsaturated, branched and linear aliphatic hydrocarbon groups; substituted and unsubstituted, branched and linear aralkyl groups; substituted and unsubstituted aryl groups, and hydrogen; and wherein $R^{12}$ and $R^{13}$ are independently selected from the group consisting of substituted and unsubstituted, branched and linear alkyl and alkoxy groups.

Specific examples of compounds of the general type show in Formula (IV) include for instance 2,2-dimethoxy-1,6-diaza-2-silacyclooctane, 2-methyl-2-methoxy-1,6-diaza-2-silacyclooctane and 2,2-dimethyl-1,6-diaza-2-silacyclooctane.

alkoxysilylalkylaminosilane having the formula (V)

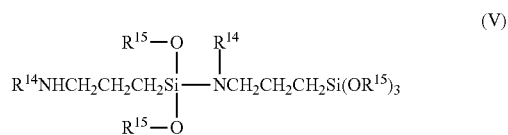

wherein $R^{14}$ is selected from the group consisting of hydrogen; saturated and unsaturated, substituted and unsubstituted aliphatic hydrocarbon groups; and substituted and unsubstituted aryl groups; and wherein $R^{15}$ is selected from the group consisting of substituted and unsubstituted, branched and linear alkyl groups.

Specific examples of a compound of the general type show in Formula (V) include for instance N—(N'-butyl-3-aminopropyl(dimethoxysilyl)), —N—(N'-butyl)-3-aminopropyl (dimethoxysilyl)), and —N—(N'-butyl)-3-aminopropyltrimethoxysilane.

Preferably the reactive silane comprises amine functionality and multiple hydrolysable alkoxy groups. A variety of silanes containing functional groups such as thiols, and hydrolysable moieties such as, chloro-, iodo-, methoxy-, ethoxy-groups may also prove viable.

Preferred amine-functional silanes utilized in the treatment step include, but are not limited to N-(2-aminoethyl)-3-aminopropyltrimethoxysilane, (3-trimethoxysilylpropyl)diethylenetriamine, 2,2-dimethoxy-1,6-diaza-2-silacyclooctane and combinations thereof. It is possible to use a number of other amine-functional silanes. Additional commercially available compounds of interest include, but are not limited to, N-(2-aminoethyl)-3-aminopropyltrimethoxysilane, 3-aminopropyltrimethoxysilane and N,N'-bis[(3-trimethoxysilyl}propyl)ethylenediamine.

If the reactive silane itself swells the silicone rubber surface, it may also be used without a swelling solvent. If the reactive silane does not have a swelling effect, the preferred concentration of the reactive silane in the treatment solution is from 0.5 to 20 wt %, more preferably from 1 to 10 wt % based on the total weight of the treatment solution. Most preferably the concentration of the reactive silane in the treatment solution is from 2.5 to 5.0 wt %.

The swelling of the silicone rubber surface may be achieved by contacting the silicone rubber surface with the silane solution, for instance by dipping, soaking, brushing, wiping, or rolling. It may also be possible to apply reactive silanes in a manner such as spray coating or vapor phase deposition. Additionally, the heating of the silicone rubber substrate may provide suitable swelling of the matrix for effective treatment.

The purpose of the drying step, if applied, is the removal of the solvent from the silicone rubber matrix, resulting in the deswelling of matrix. This may result possibly in physically trapping of the functional silane oligomers and/or polymers in the matrix and may likely drive the oliogomers/polymers to the substrate surface where atmospheric water vapor is present, resulting in further oligomerization or polymerization of the reactive silane.

Reaction of the reactive silane with atmospheric water, water being adsorbed to the silicone rubber surface, and/or with silanol moieties created in the silicone rubber matrix may determine the formation of oligomers and possibly polymers that may either be covalently bound to the silicone rubber or may be physically entrapped in the silicone rubber matrix.

The drying step is however optional, since drying may be performed also during the heat treatment step.

The reactive silane-treated silicone substrate and/or device may be thermally treated at temperature such as from 50 to 120° C., more preferably from 80 to 120° C. Typical treating times would be around 5 minutes or more. However, it may be possible to reduce the treatment time to less than 5 minutes, depending also on the temperature used.

Thermal treatment may yield a highly cross-linked network within the silicone rubber with reactive silane functionality (in the form of molecules, oligomers or even polymers) interpenetrating into the network. The presence of reactive functionality on the silicone rubber surface will facilitate wetting and adhesion of coatings such as hydrophilic lubricious coatings to the activated silicone rubber surface.

The dipping and heat treatment time required for the silane treatment of silicone rubber is comparable to that of current industrial dip and cure processes for coating medical devices.

According to an embodiment of the invention there is also provided a silicone rubber substrate (wherein substrate herein includes 2-dimensional as well as 3-dimensional surfaces) or article activated with reactive functionality according to the method of the present invention. The activation step is useful in preparing such substrate or article to be further coated for instance with hydrophilic coatings which render the silicone rubber surface hydrophilic.

The invention also relates to an activated silicone rubber substrate or article obtainable by the activation method according to the invention, fully or partially coated with an hydrophilic coating. The hydrophilic coating can be applied to a variety of physical forms, including films, sheets, rods, tubes, molded parts (regular or irregular shape), fibers, fabrics, and particulates.

The hydrophilic coating composition coated onto the activated substrate or article may be any coating which comprises an hydrophilic medium. This can be a lubricious coating, an antimicrobial coating, a non-fouling coating or a drug eluting coating.

Preferably the coating composition is a hydrophilic coating composition comprising a hydrophilic polymer capable of providing hydrophilicity to the coating, which polymer may be synthetic or bio-derived and can be blends or copolymers of both. Suitable hydrophilic polymers include but are not limited to poly(lactams), for example polyvinylpyrollidone (PVP), polyurethanes, homo- and copolymers of acrylic and methacrylic acid, polyvinyl alcohol, polyvinylethers, maleic anhydride based copolymers, polyesters, vinylamines, polyethyleneimines, polyethyleneoxides, poly(carboxylic acids), polyamides, polyanhydrides, polyphosphazenes, cellulosics, for example methyl cellulose, carboxymethyl cellulose, hydroxymethyl cellulose, and hydroxypropylcellulose, heparin, dextran, polypeptides, for example collagens, fibrins, and elastin, polysachamides, for example chitosan, hyaluronic acid, alginates, gelatin, and chitin, polyesters, for example polylactides, polyglycolides, and polycaprolactones, polypeptides, for example collagen, albumin, oligo peptides, polypeptides, short chain peptides, proteins, and oligonucleotides.

Generally the hydrophilic polymer has a molecular weight in the range of about 8,000 to about 5,000,000 g/mol, preferably in the range of about 20,000 to about 3,000,000 g/mol and more preferably in the range of about 200,000 to about 2,000,000 g/mol. In one embodiment of the invention the hydrophilic polymer may be used in more than 1 wt %, for example more than 5 wt %, or more than 50 wt %, based on the total weight of the dry coating. The hydrophilic polymer can be present up to 99 wt %, or up to 95%, based on the total weight of the dry coating.

The hydrophilic coating composition may be in the form of a solution or a dispersion comprising a liquid medium. Herein any liquid medium that allows application of the hydrophilic coating formulation on a surface would suffice. Examples of liquid media are alcohols, like methanol, ethanol, propanol, butanol or respective isomers and aqueous mixtures thereof or acetone, methylethyl ketone, tetrahydrofuran, dichloromethane, toluene, and aqueous mixtures or emulsions thereof.

The hydrophilic coating composition according to the invention may additionally include various additives includes conventional ingredients like pigments, dyes, wetting agents, dispersing and stabilising agents (usually surfactants or emulsifiers), rheology control agents, flow-promoting agents, extenders, defoaming agents, plasticisers, thickeners, heat stabilisers, levelling agents, anti-cratering agents, fillers, sedimentation inhibitors, UV absorbers, antioxidants, organic co-solvents, wetting agents, fungicides, bacteriocides, anti-freeze agents, coalescents, waxes and the like introduced at any stage of the production process or subsequently.

There is according to the invention further provided a method of coating the activated silicone rubber surfaces of a substrate using a hydrophilic coating composition as described above. The hydrophilic coating compositions once applied may be allowed to dry naturally at ambient temperature, or the drying process may be accelerated by heat or other type of radiations such as UV.

Hydrophilic surfaces are widely applied in medical devices. The invention is thus also directed to the use of reactive silanes for activating medical devices.

The invention will be elucidated with reference to the following, non-limiting examples. Unless otherwise specified all parts, percentages and ratios are on a weight basis. The term comparative means that it is not according to the invention.

EXAMPLES

Substrates Used

Platinum (Pt)-cured commercially available medical grade silicone tubing from Raumedic (SIK8649) was used in all examples.

The silicone rubber substrates were cleaned by sonication in isopropanol for 10 min at 40° C. The clean devices were then blown dry with nitrogen and hung in a fumehood for at least 2 hrs prior to coating Reactive Silane
a) 3-(trimethoxysilylpropyl)diethylenetriamine [CAS 35141-30-1] was purchased from Gelest, Inc.
b) N-3-[(amino(polypropylenoxy)]aminopropyltrimethoxysilane (3-4 EO)
c) 2,2-dimethoxy-1,6-diaza-2-silacyclooctane [CAS 182008-07-7] purchased from Gelest, Inc.

Staining Solutions

A solution of Coomassie® Brilliant Blue R-250 (CAS: 6104-59-2) was used to visualize the presence of amine groups on the activated silicone rubber surface (49.95 wt % $H_2O$, 40 wt % methanol, 10 wt % acetic acid, 0.05 wt % Comassie® Brilliant Blue R-250 (m/m))

A solution of Congo Red (CAS: 573-58-0) was used to visualize the applied coating as described below (99 wt % $H_2O$, 1 wt % congo red).

Equipment

Harland FTS 5000: friction tester was used for determination of coating lubricity and wear resistance.

Perkin Elmer Spectrum One spectrophotometer was used to record FTIR-ATR spectra.

Coating System A

The coating system A had the following composition:
PTGL1000(T-H)$_2$: 5.00% (w/w)
Irgacure 2959 (Aldrich): 0.20% (w/w)
Ethanol (Merck, 96% extra pure PH EUR, PB): 94.8% (w/w)

The hydrophiliv polymer PTGL1000(T-H)$_2$ was synthesized as described on pages 17-18 of WO 2009/112548 A1.

The above mentioned components were added to a brown colored glass flask and mixed overnight (~16 hours) at room temperature. The next morning the primer formulation was a homogeneous liquid with a viscosity of 7 mPa·s. Herein the viscosity was measured on a Brookfield CAP1000, v.1.2 in combination with cone nr.1 at 25° C.

The above coating formulation A was applied to the samples.

Example of Silicone Rubber Surface Activation

Silicone devices (i.e., silicone tubing) were cleaned by sonication in isopropanol for 10 min at 40° C. and subsequently dried under a flow of air or nitrogen. Samples were dipped in a 2.5 wt % solution of reactive silane in heptane for 15 s. After removal of the sample from the silane solution, air or nitrogen was gently blown through inner lumen of the device for approximately 5 s. The device was then treated in an 80° C. oven for 5 min, prior to coating with the coating system A described above.

After silane treatment and heat treatment, the samples were examined with FTIR-ATR. Evidence of surface modification with silane was observed as increased absorbance that correlated to the presence of amine functionality (and possibly carbamate ion): 3500-3000 cm$^{-1}$, 1650-1500 cm$^{-1}$.

After the silane treatment and heat treatment, the samples were also sonicated in isopropanol for 10 minutes to remove all loosely bound silane species. The sonicated, silane-treated samples were dried, dipped in the Coomassie® Brilliant Blue staining solution for 5 minutes, rinsed with H$_2$O and examined. The untreated silicone rubber substrates were not stained by the blue dye, whereas the amines present on the silicone rubber surface after treatment with amine-containing silanes lead to adsorption of the dye and an evident blue coloration.

Application of Coating System A

The silane-treated samples were then dip-coated in coating system A as described above.

The coated devices were examined visually and with an optical microscope after staining with congo red. Wetting of the coating system A on silane-treated catheters was good as evidenced by homogeneous coverage of the red coloured coating A. Coating of the coating system on the catheter outer lumen as observed with an optical microscope was found to be good for the silane-treatment conditions mentioned above.

g clamp force was applied over a 10 cm test length of the tube. Tubes treated with amine-containing silanes using the conditions mentioned above showed excellent wear-resistance.

The Harland FTS 5000 test results for silane-treated and coated medical grade, platinum cured silicone tubing are shown in FIGS. 1A)-D). Test parameters of the test shown in FIG. 1 are the following: 300 g clamp force, 25 cycles, 10 cm pull length, 1 cm s$^{-1}$ pull speed, periodic pad cleaning.

Figure 1B:
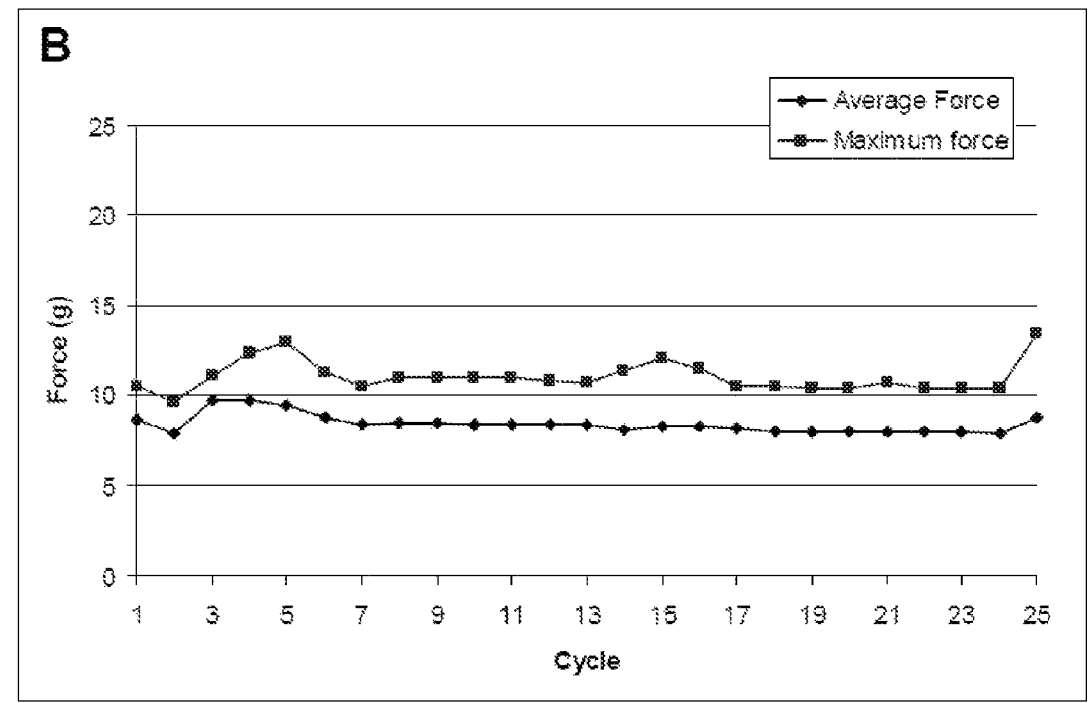
Figure 1C:
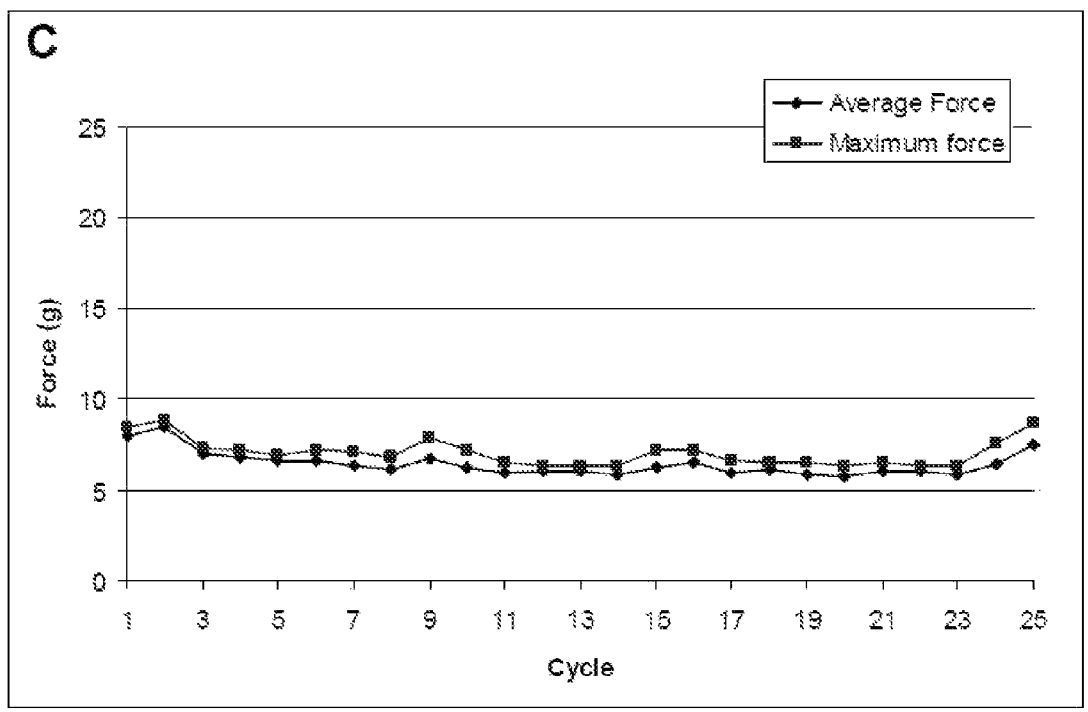
Figure 1D:
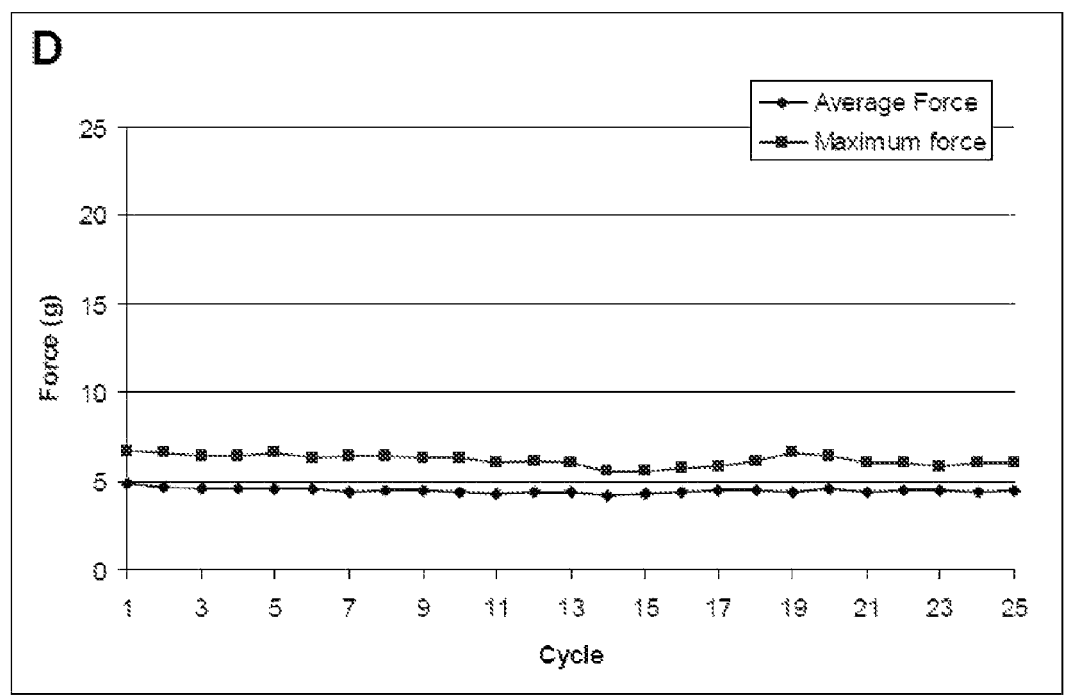

For the set of samples considered (see table 1), the 3-(trimethoxysilylpropyl)diethylenetriamine treated samples had the overall lowest recorded friction values, as shown in FIG. 1D). All samples had acceptable peak friction values (f<25 g) and wear levels (w<5 g).

In FIGS. 1A)-D), the average force data corresponds to the dynamic friction measurements, whereas the maximum force data corresponds to the static friction measurements.

The same procedure was followed to prepare examples having parameters as shown in table 1 below and a comparative example as shown in table 2. The cleaning step, staining and coating application were the same for all the examples presented in the two tables.

TABLE 1

| Example | Silane | Solvent | Concentration (wt %) | Soak time (s) | Treatment temp. (° C.) | Treatment time (min) | Brilliant blue staining | Adhesion of hydrophilic coating (tape test) |
|---|---|---|---|---|---|---|---|---|
| 1 | A | Diethyl ether | 5 | 60 | 110 | 5 | Deep blue | Excellent (0%) |
| 2 | A | Pentane | 5 | 60 | 110 | 5 | Deep blue | Excellent (0%) |
| 3 | A | Cyclo-hexane | 5 | 60 | 110 | 5 | Deep blue | Excellent (0%) |
| 4 | A | Hexane | 5 | 60 | 110 | 5 | Deep blue | Excellent (0%) |
| 5 | A | Ethyl-acetate | 5 | 60 | 110 | 5 | Deep blue | Excellent (0%) |
| 6 | A-D* | Heptane | 2.5 | 30 | 120 | 5 | NA | v. good |
| 7 | B | Ethyl acetate | 5 | 60 | 110 | 5 | blue | NA |
| 8 | C | Ethyl acetate | 5 | 60 | 110 | 5 | Deep blue | Excellent |
| 9 | C | Cyclo-hexane | 5 | 15 | 90 | 5 | Blue | Excellent |
| 10 | C | Heptane | 2.5 | 30 | 80 | 5 | NA | v. good |
| 11 | C | Heptane | 2.5 | 30 | 60 | 5 | Blue | NA |
| 12 | C | Heptane | 2.5 | 60 | 60 | 10 | deep blue | NA |
| 13 | C | Heptane | 2.5 | 15 | 120 | 5 | Deep blue | NA |
| 14 | C-B* | Heptane | 2.5 | 30 | 80 | 5 | NA | v. good |
| 15 | C-C* | Heptane | 2.5 | 30 | 120 | 5 | NA | v. good |
| 16 | C-A* | Heptane | 2.5 | 15 | 80 | 5 | NA | good |

*Capital letters above denote the corresponding Harland FTS 5000 test results in FIGS. 1A-1D.
NA: not available

TABLE 2

| Comparative example | | | | | | | | |
|---|---|---|---|---|---|---|---|---|
| Comp. Example | Silane | Solvent | Concentration (wt %) | Soak time (s) | Treatment temp (° C.) | Treatment time (min) | Brilliant blue staining | Adhesion of hydrophilic coating (tape test) |
| I | A | Ethanol | 5 | 60 | 110 | 4 | No colour | No wetting |

The solvent used was a non-swelling solvent. The solvent was also reactive with silane.

Adhesion of the coating system A to silane-treated PDMS was examined with a dry adhesion test: a length of cellophane tape was firmly pressed onto surface of the lumen. The procedure followed was according to ASTM D3330/D3330M-04, a standard test method for peel adhesion of pressure-sensitive tape. The tape was then slowly peeled from the surface at one edge and subsequently examined for any coating that was removed from the device. Excellent adhesion of the coating was observed for the silane-treatment conditions mentioned above.

Wear-resistance of the coating system when applied to silane-treated PDMS was evaluated with Harland FTS 5000. Friction force was recorded for 25 cycles during which a 300

FIGS. 1A-1D

Harland FTS 5000 test results for silane-treated and coated medical grade, platinum cured silicone tubing.
Details regarding FIG. 1A)-1D):
FIG. 1A 2.5 wt % solution of 2,2-dinnethoxy-1,6-diaza-2-silacyclooctane in heptane, 15 s dip, 5 min treatment at 80° C.
FIG. 1B 2.5 wt % solution of 2,2-dinnethoxy-1,6-diaza-2-silacyclooctane in heptane, 30 s dip, 5 min treatment at 80° C.
FIG. 1C 2.5 wt % solution of 2,2-dinnethoxy-1,6-diaza-2-silacyclooctane in heptane, 30 s dip, 5 min treatment at 120° C.

FIG. 1D 2.5 wt % solution of 3-(trimethoxysilylpropyl)diethylenetriamine in heptane, 30 s dip, 5 min treatment at 120° C.

The invention claimed is:

1. A method for activating silicone rubber surfaces comprising steps of:
   i) swelling at least a surface of a silicone rubber matrix with a silicone rubber swelling solvent;
   ii) treating the silicone rubber matrix during or after the swelling with a solution comprising at least a reactive silane, wherein the reactive silane comprises at least one hydrolytically labile bond linked to at least one of the Si atoms present in the reactive silane, the reactive silane comprising a reactive silane according to Formula (III), Formula (IV), or Formula (V), thereby forming a treated silicone rubber matrix; and
   iii) drying and/or heat treating the treated silicone rubber matrix, wherein Formula (III) is:

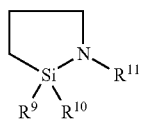 (III)

wherein R9 and R10 are independently selected from the group consisting of branched and linear, substituted and unsubstituted alkyl, alkenyl, and alkoxy groups; and wherein R11 is selected from the group consisting of substituted and unsubstituted, saturated and unsaturated, branched and linear aliphatic hydrocarbon groups, substituted and unsubstituted, branched and linear aralkyl groups, substituted and unsubstituted aryl groups, and hydrogen;

Formula (IV) is:

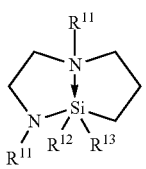 (IV)

wherein each R11 may be the same or different and is selected from the group consisting of substituted and unsubstituted, saturated and unsaturated, branched and linear aliphatic hydrocarbon groups, substituted and unsubstituted, branched and linear aralkyl groups, substituted and unsubstituted aryl groups, and hydrogen; and R12 and R13 may be the same or different and are selected from the group consisting of substituted and unsubstituted, branched and linear alkyl and alkoxy groups; and Formula (V) is:

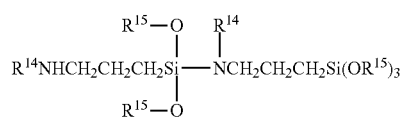 (V)

wherein R14 is selected from the group consisting of hydrogen, saturated and unsaturated, substituted and unsubstituted aliphatic hydrocarbon groups, and substituted and unsubstituted aryl groups; and R15 is selected from substituted and unsubstituted, branched and linear alkyl groups.

2. The method according to claim 1, wherein the hydrolytically labile bond is present in the form of a —Si—O—Si— bond, or as a hydrolysable group linked to a Si atom selected from the group consisting of halogens, methoxy groups, ethoxy groups, other alkoxy groups, amines, thiols and combinations thereof.

3. The method according to claim 1, wherein the reactive silane comprises a functional group selected from the group consisting of primary, secondary or tertiary amines, thiols, hydroxyls, carboxyl groups and combinations thereof.

4. The method according to claim 1, wherein the reactive silane comprises a functional group selected from the group consisting of mono- or poly-unsaturated ethylenic functionalities, allyl, acrylic, vinylic and epoxide functionalities and combinations thereof.

5. The method according to claim 1, wherein the reactive silane comprises an amine functional group.

6. The method according to claim 1, wherein the amount of reactive silane in the solution is from 0.5 to 20 wt %.

7. The method according to claim 1, wherein the reactive silane is dispersed or dissolved in the silicone rubber swelling solvent.

8. The method according to claim 1, wherein the reactive silane comprises a reactive silane according to Formula (III).

9. The method according to claim 1, wherein the reactive silane comprises a reactive silane according to Formula (IV).

10. The method according to claim 1, wherein the reactive silane comprises a reactive silane according to Formula (V).

11. The method according to claim 1, wherein the silicone rubber swelling solvent is capable of causing a swelling ratio of the silicone rubber matrix of higher than 1.05.

12. The method according to claim 1, wherein the silicone rubber swelling solvent is capable of causing a swelling ratio of the silicone rubber matrix of higher than 1.10.

13. The method according to claim 1, wherein the silicone rubber swelling solvent is capable of causing a swelling ratio of the silicone rubber matrix of higher than 1.20.

14. The method according to claim 1, wherein the silicone rubber swelling solvent is selected from the group consisting of pentane, hexane, cyclohexane, heptane, ethyl acetate and diethyl ether, and mixtures thereof.

15. The method of claim 1, further comprising the step of applying a hydrophilic coating to the surface of the silicone rubber matrix.

16. A silicone rubber surface that has been activated by the method according to claim 1.

17. The method according to claim 9, wherein the silicone rubber swelling solvent is capable of causing a swelling ratio of the silicone rubber matrix of higher than 1.20.

18. The method according to claim 9, wherein the silicone rubber swelling solvent is selected from the group consisting of pentane, hexane, cyclohexane, heptane, ethyl acetate and diethyl ether, and mixtures thereof.

* * * * *